UNITED STATES PATENT OFFICE.

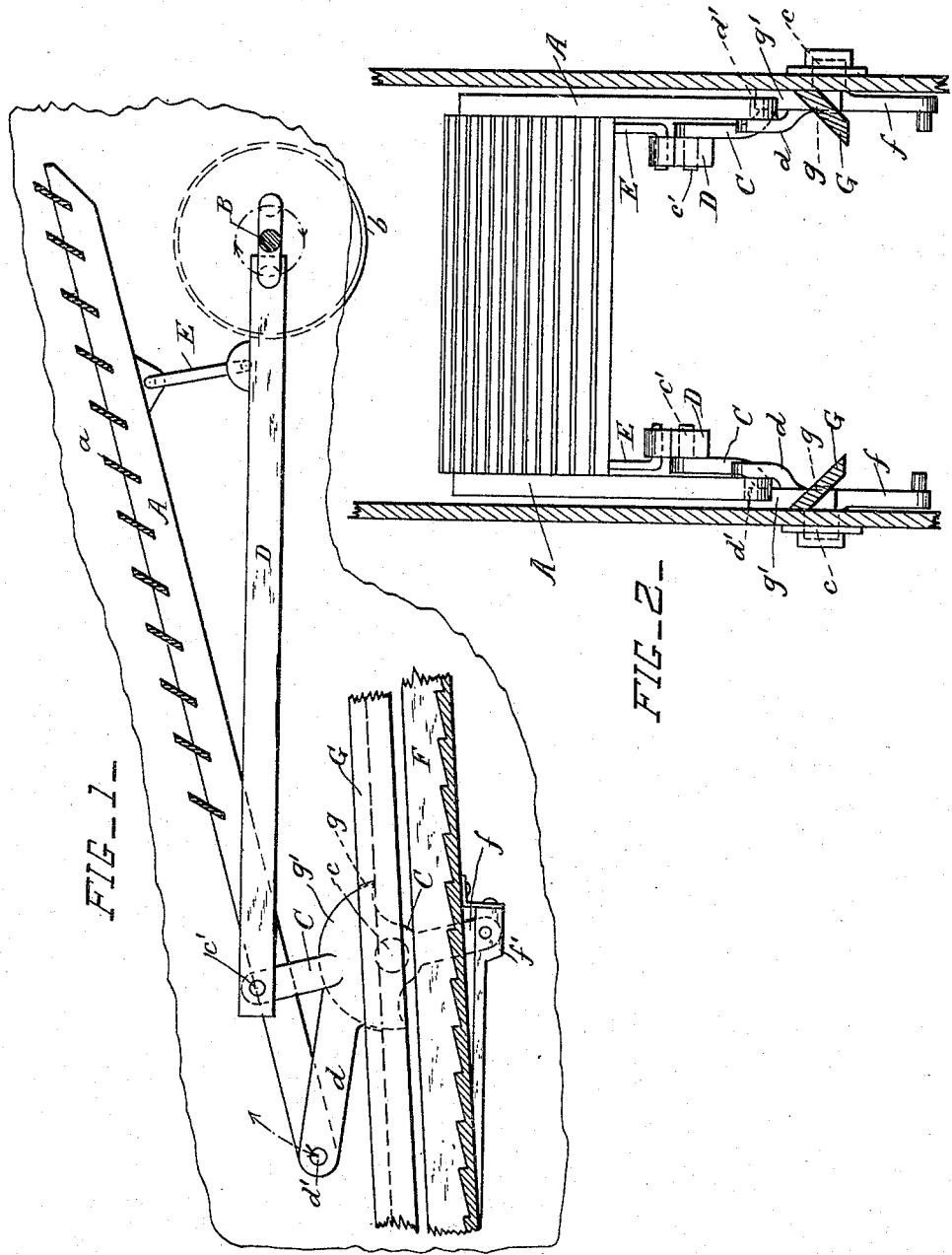

FRANK F. LANDIS, OF WAYNESBOROUGH, PENNSYLVANIA.

GRAIN-SEPARATOR.

SPECIFICATION forming part of Letters Patent No. 492,213, dated February 21, 1893.

Application filed May 28, 1892. Serial No. 434,735. (No model.)

*To all whom it may concern:*

Be it known that I, FRANK F. LANDIS, a citizen of the United States, residing at Waynesborough, in the county of Franklin and State of Pennsylvania, have invented certain new and useful Improvements in Grain-Separators; and I do hereby declare the following to be a full, clear, and exact description of the invention, such as will enable others skilled in the art to which it appertains to make and use the same.

This invention relates to the shaking devices of grain separators; and it consists in the novel construction and combination of the parts hereinafter fully described and claimed whereby the straw shaker is supported and actuated.

In the drawings: Figure 1 is a longitudinal section through a shaker. Fig. 2 is a cross-section through the case of the separator, showing the means for supporting the shaker.

The shaker consists of longitudinal bars A provided with inclined cross slats $a$, and is adapted to receive the straw and grain from the beaters substantially as shown and described in the Letters Patent No. 447,433, issued to me on March 3, 1891. The shaker receives its motion from a crank-shaft B at its rear end, driven by the belt pulley $b$ but the crank-shaft is not adapted to operate the shaker direct according to the present invention.

C is a lever provided with a pivot $c$ which is journaled in the case of the machine.

D is a connecting rod the front end of which is pivoted on the pin $c'$ projecting from the upper end of the lever C. The other end of the said connecting rod is connected to one of the cranks of the crank-shaft as shown. An arm $d$ projects upwardly and forwardly from the lever C and is provided with a projecting pin $d'$ preferably arranged at a greater distance from the lever pivot $c$ than the pin $c'$. The front end of the longitudinal bar A of the shaker is pivoted on the pin $d'$, and its rear end is pivotally supported from the rear end of the connecting rod D by the link E. The shaker is provided with levers C, connecting rods D and links E at each side, the mechanism at one side being exactly the same as at the other. The connection of the front end of the shaker to the arm $d$ permits the front end of the shaker to have an increased tossing motion which is found very advantageous in accelerating the movement of the straw at this point. The cross-slats of the shaker are arranged at any approved angle, or if necessary at different angles as set forth in the above-mentioned patent. The rear end of the shaker is tossed and reciprocated by the revolving crank-shaft.

The lower part of the lever C is provided with an arm $f$ for supporting and oscillating the grain pan F in the usual manner, as fully shown in the beforementioned patent. The arm $f$ may be pivoted to the grain pan direct or to a stiffening piece $f'$ secured to the pan, and the front end of the pan is supported by pivoted links, not shown in the drawings.

G is a downwardly inclined ledge secured to each side of the case to prevent the grain from falling between the sides of the grain pan and the case. Slots $g$ are cut in each ledge for the levers C to pass through and in order to prevent grain from falling through the ends of these slots, a sector $g'$ is formed on the lever C concentric with the pivot $c$, and of a size equal to the length of the slot. This sector works against the side of the case and effectually prevents any grain from falling through the slot in the ledge. The arms and the upper part of the lever are arranged to work clear of the sides of the case, as shown in Fig. 2, to avoid friction. The two ends of the shaker receive about the same amount of vertical or tossing motion, but the front end receives the greater amount of propelling or longitudinal motion. This is caused by the substantially circular movement of the rear end of the shaker over the crank-shaft, while the front end of the shaker is moved upwardly and forwardly for about one-sixth of a circle and returned to its original position along the same circular arc upon which it moved forward.

What I claim is—

1. In a separator, the combination, with a straw-shaker, of a crank-shaft at the rear end of the shaker, the connecting-rods operated by the crank-shaft, the levers pivoted to the case and to the said connecting-rods and provided with upwardly and forwardly-projecting arms pivotally supporting the front end of the shaker, and the links pivotally connecting the rear end of the said shaker with the said connecting-rods, substantially as set forth.

2. In a separator, the combination, with the levers pivoted to the case and adapted to reciprocate the straw shaker and the grain pan, of the ledges secured to the case for guiding the grain into the grain pan and provided with slots for the said levers to pass through, and the sectors arranged concentric with the lever pivots and adapted to fill the said slots, substantially as set forth.

In testimony whereof I affix my signature in presence of two witnesses.

FRANK F. LANDIS.

Witnesses:
 HERBERT W. T. JENNER,
 DANIEL S. BEARD.